(12) United States Patent
Yun

(10) Patent No.: US 7,248,408 B2
(45) Date of Patent: Jul. 24, 2007

(54) COLOR DISPLAY APPARATUS USING ONE PANEL DIFFRACTIVE-TYPE OPTICAL MODULATOR

(75) Inventor: Sang Kyeong Yun, Gyeonggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 11/352,743

(22) Filed: Feb. 13, 2006

(65) Prior Publication Data
US 2006/0208175 A1 Sep. 21, 2006

(30) Foreign Application Priority Data
Feb. 16, 2005 (KR) .................. 10-2005-0012831

(51) Int. Cl.
*G02B 5/18* (2006.01)
(52) U.S. Cl. .................. 359/567; 359/569; 359/572; 359/573; 359/292
(58) Field of Classification Search ............ 359/223, 359/224, 290–292, 295, 298, 318, 566, 567, 359/569, 572, 573, 576
See application file for complete search history.

(56) References Cited

U.S. PATENT DOCUMENTS

| | | |
|---|---|---|
| 5,986,740 A | 11/1999 | Robinson et al. |
| 6,373,549 B1 | 4/2002 | Tombling et al. |
| 7,133,184 B2 * | 11/2006 | Shin et al. .................. 359/291 |
| 7,149,028 B2 * | 12/2006 | Yun .......................... 359/290 |

* cited by examiner

*Primary Examiner*—Evelyn A. Lester
(74) *Attorney, Agent, or Firm*—Christensen O'Connor Johnson Kindness PLLC

(57) ABSTRACT

Disclosed herein is a color display apparatus using a one-panel diffractive-type optical modulator. The color display apparatus includes a plurality of light sources, an illumination lens system, a diffractive-type optical modulator, a filter system, and a projection system. The light sources simultaneously emit the light beams of corresponding wavelengths. The illumination lens system allows respective light beams to be converted into linear parallel light. The diffractive-type optical modulator forms diffractive light by diffracting incident light when the locations of at least two neighboring reflection parts vary to a predetermined distance by an actuating means. The filter system allows diffractive light having a desired diffractive order for respective wavelengths to pass therethrough when diffractive light having a plurality of diffractive orders for the respective wavelengths enters from the diffractive-type optical modulator. The projection system generates an image on a target object by scanning diffractive light filtered by the filter system on the target object.

8 Claims, 11 Drawing Sheets

COLOR DISPLAY APPARATUS USING ONE PANEL DIFFRACTIVE-TYPE OPTICAL MODULATOR

BACKGROUND OF THE INVENTION

1. Field of the Invention

The present invention relates generally to a color display apparatus and, more particularly, to a color display apparatus using a one-panel diffractive-type optical modulator that is capable of forming diffractive light for incident light having a plurality of wavelengths using a single optical modulation device.

2. Description of the Related Art

With the development of micro technology, so-called micro Electro Mechanical Systems (MEMS) devices and small-sized equipment in which the MEMS devices are assembled have attracted significant attention.

A MEMS device is a device in which an actuation body which is formed on a substrate, such as a silicon substrate or a glass substrate, in a micro-structure form and configured to output mechanical actuation force, and a semiconductor Integrated Circuit (IC) that is configured to control the actuation body are electrically and mechanically combined. The MEMS device is basically characterized in that the actuation body having a mechanical structure is a part of the device, and the operation of the actuation body is electrically performed using Coulomb's force between electrodes.

FIG. 1 is a view showing the construction of a Grating Light Valve (GLV) device that Silicon Light Machine (SLM) Inc. has developed as a light intensity conversion device for a laser display, that is, an optical modulator.

The GLV device 21, as shown in FIG. 1, is configured such that a common substrate-side electrode 23 is formed on an insulation substrate 22, such as a glass substrate, a plurality of beams 24, for example, six beams 241, 242, 243, 244, 245 and 246 in the present invention, that cross the common substrate-side electrode 23, are installed in a bridge form, and are arranged in parallel.

The beams 24, each of which is formed of a bridge member 25 and a combined reflective layer and actuation-side electrode 26 mounted on the bridge member 25, are parts that are collectively called ribbons.

When minute voltage is applied between the substrate-side electrode 23 and the combined reflective layer and actuation-side electrodes 26, the beams 24 approach the substrate-side electrode 23 due to the above-described electrostatic phenomenon. In contrast, when the application of voltage is stopped, the beams 24 move away from the substrate-side electrode 23 and are restored to their original positions.

The GLV device 21 alternately varies the heights of the combined reflective layer and actuation-side electrodes 26 due to the approach and separation operation of the plurality of beams 24 with respect to the substrate-side electrode 23 (that is, the approach and separation operation of alternate beams), and modulates the intensity of light reflected from the actuation-side electrode 26 using the diffraction of light (one light spot is irradiated for all of the six beams 24).

FIG. 2A is a diagram showing an example of a conventional one-panel optical apparatus using a GLV device as an optical modulation device to which a MEMS device is applied, or using a piezoelectric diffractive-type optical modulator.

Referring to FIG. 2A, the conventional one-panel optical apparatus includes a light source system 50, a light condensing unit 52, an illumination lens system 54, a flat-type color wheel 57, a GLV device 58, a Fourier filter system 59, a projection system 62, and a screen 65.

The light source system 51 is formed of a plurality of light sources 51a to 51c, and the light-condensing unit 52 is formed of a single reflective mirror 53a and a plurality of dichroic mirrors 53b and 53c.

The plurality of light sources 51a to 51c includes, for example, a Red (R) light source 51a, a Green (G) light source 51b, and a Blue (B) light source 51c. The light condensing unit 52 condenses a blue-colored light, a green-colored light and a red-colored light using the single reflective mirror 53a and a plurality of dichroic mirrors, so that a multi-beam is formed, therefore a single illumination system is constructed.

Subsequently, the illumination lens system 54 converts the condensed multi-beam into a linear parallel light beam, and causes the linear parallel light to enter into the GLV device 58 through the flat-type color wheel 57.

In more detail, the flat-type color wheel 57 includes color filters that allow only light beams of the multi-beam corresponding to respective colors to pass therethrough, a coupler to which the color filters are attached, and a motor that is attached to the coupler and configured to generate rotational force. The flat-type color wheel 57 sequentially separates the colors of light beam from each other as the coupler and the color filters attached to the coupler in a flat form rotate according to the rotational velocity of the motor.

When a linear parallel light having a single wavelength enters from the flat-type color wheel 57, the GLV device 58 forms diffractive light by performing optical modulation on the linear parallel light having the corresponding wavelength for the entering time, and causes the formed diffractive light to be incident on the Fourier filter system 59.

It is preferred that the Fourier filter system 59 be composed of a Fourier lens 60 and a dichroic filter 61. The Fourier filter system 59 separates the diffractive light according to order and passes only desired orders of diffractive light therethrough.

Meanwhile, the projection system 62 includes a scanner 63 and a projection lens 64, and projects the entering diffractive light onto the screen 65.

FIG. 2B is a diagram showing an example of a conventional three-panel optical apparatus using a GLV device as an optical modulation device to which a MEMS device is applied, or using a piezoelectric diffractive-type optical modulator. In the present example, a case where the optical apparatus is applied to a laser display is described The laser display 51 related to the present example is used as, for example, a large-sized screen projector and, in particular, a digital image projector or the image projection apparatus of a computer.

The laser display 51, as shown in FIG. 2B, include laser light sources 52R, 52G and 52B, respectively provided with R, G and B colors, mirrors 54R, 54G and 54B respectively installed on the optical axes of the laser light sources, color illumination optical systems (lens group) 56R, 56G and 56B, and GVL devices 58R, 58G and 58B.

The laser light sources 52R, 52G and 52B, for example, emit an R laser beam (having a wavelength of 642 nm and an optical output of about 3 W), a G laser beam (having a wavelength of 532 nm and an optical output of about 2 W), and a B laser beam (having a wavelength of 457 nm and an optical output of about 1.5 W), respectively.

Furthermore, the laser display 51 includes a color synthesizing filter 60 for synthesizing the R, G and B laser beams whose intensities of light are respectively modulated by the GVL devices 58R, 58G and 58B, a spatial filter 62, a diffuser 64, a mirror 66, a Galvano-scanner 68, a projection optical system (lens group) 70, and a screen 72. The color synthesizing filter 60 includes, for example, a dichroic mirror.

In the laser display 51 of the present example, RGB laser beams emitted from the laser light sources 52R, 52G and 52B respectively pass through the mirrors 54R, 54G and 54B, and are respectively incident on the GVL devices 58R, 58G and 58B of the color illumination optical systems 56R, 56G and 56B. The laser beams are color-separated video signals, and are input to the GVL devices 58R, 58G and 58B in a synchronized manner.

Furthermore, the respective laser beams are diffracted by the GVL devices 58R, 58G and 58B, thus being spatially modulated. These tri-color diffractive light beams are synthesized by the color synthesizing filter 60 and then only signal components are extracted by the spatial filter 62.

Thereafter, the RGB video signals experience a decrease in the laser spectrum thereof by the diffuser 64, are emitted on a space by the Galvano-scanner 68 that is synchronized with video signals through the mirror 66, and are projected in full-color image form onto the screen 72 by the projection optical system 70.

Meanwhile, as described above, the one-panel-type optical apparatus has a simple structure, reduces cost, and enables the realization of the optical system. However, the one-panel-type optical apparatus is problematic in that the optical modulator used requires operation velocity three times faster than that of an existing modulator and, therefore, the life span thereof is reduced by ⅓. Furthermore, the one-panel-type optical apparatus is problematic in that light efficiency is lowered because a color wheel is necessary.

Furthermore, the three-panel-type optical apparatus is problematic in that the optical systems thereof are complicated and the cost thereof increases because optical modulators are provided so as to correspond to respective colors of laser light sources.

SUMMARY OF THE INVENTION

Accordingly, the present invention has been made keeping in mind the above problems occurring in the prior art, and an object of the present invention is to provide a color display apparatus using a one-panel diffractive-type optical modulator which is capable of forming diffractive light for incident light having a plurality of wavelengths using a single optical modulator.

In order to accomplish the above object, the present invention provides a color display apparatus using a one-panel diffractive-type optical modulator, including a plurality of light sources for simultaneously emitting the light beams of corresponding wavelengths; an illumination lens system for allowing respective light beams, which are emitted from the plurality of light sources, to be converted into linear parallel light and simultaneously enter, a diffractive-type optical modulator comprising a substrate, a plurality of reflecting parts arranged to form an array, configured such that center portions of the plurality of reflection parts are spaced apart from the substrate and surfaces of the plurality of reflection parts oppose the substrate reflect incident light, and configured to be supported by the substrate, and an actuating means for moving the center portions of the plurality of reflection parts so as to become away from or approach the substrate, the diffractive-type optical modulator forming diffractive light by diffracting incident light when the locations of at least two neighboring reflection parts vary to a predetermined distance by the actuating means, and the reflecting parts simultaneously emitting diffractive light having a plurality of wavelengths by allowing the plurality of reflective units to generate and emit diffractive light for the incident light of respective assigned wavelengths when the wavelengths of the incident light to have to be modulated by the plurality of reflective unit are assigned and linear parallel light having different wavelengths different enters simultaneously, a filter system for allowing diffractive light having a desired diffractive order for respective wavelengths to pass therethrough when diffractive light having a plurality of diffractive orders for the respective wavelengths enters from the diffractive-type optical modulator, and a projection system for generating an image on a target object by scanning diffractive light filtered by the filter system on the target object.

In addition, the present invention provides A color display apparatus using a one-panel diffractive-type optical modulator, including a plurality of light sources for simultaneously emitting the light beams of corresponding wavelengths; an illumination lens system for converting the light beams, which are emitted from the plurality of light sources, into linear parallel light and causing the converted light to enter, a diffractive-type optical modulator comprising a substrate, a plurality of first reflection parts arranged to form an array, configured such that center portions of the plurality of first reflection parts are spaced apart from the substrate and have one or more one holes so that surfaces of the plurality of first reflection parts oppose the substrate reflect incident light and the incident light is passed therethrough, and configured to be supported by the substrate, a second reflection part configured to be located between the first reflection parts and the substrate, to be spaced apart from the first reflection parts, and to reflect incident light that passes through one or more open holes of the first reflection parts, and an actuating means for moving the center portions of the plurality of reflection parts so as to vary distances to the second reflection parts and varying the amount of diffractive light formed by reflective light of the first and second reflection parts, the diffractive-type optical modulator forming diffractive light by diffracting incident light when the locations of at least two neighboring first reflection parts vary to a predetermined distance with respect to those of the second reflection parts by the actuating means, and emitting diffractive light having a plurality of wavelengths by allowing the plurality of first reflective unit to generate and emit diffractive light for incident light of assigned wavelengths when the wavelengths of the incident light to have to be modulated by the plurality of first reflective units are assigned and linear parallel light having different wavelengths enters simultaneously, a filter system for passing diffractive light having a desired diffractive order for respective wavelengths therethrough when diffractive light having a plurality of diffractive orders for the respective wavelengths enters from the diffractive-type optical modulator, and a projection system for generating an image on a target object by scanning diffractive light filtered by the filter system on the target object

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Now, a color display apparatus using a one-panel diffractive-type optical modulator according to a preferred embodiment of the present invention is described in detail with reference to the accompanying drawings.

Figure 1:
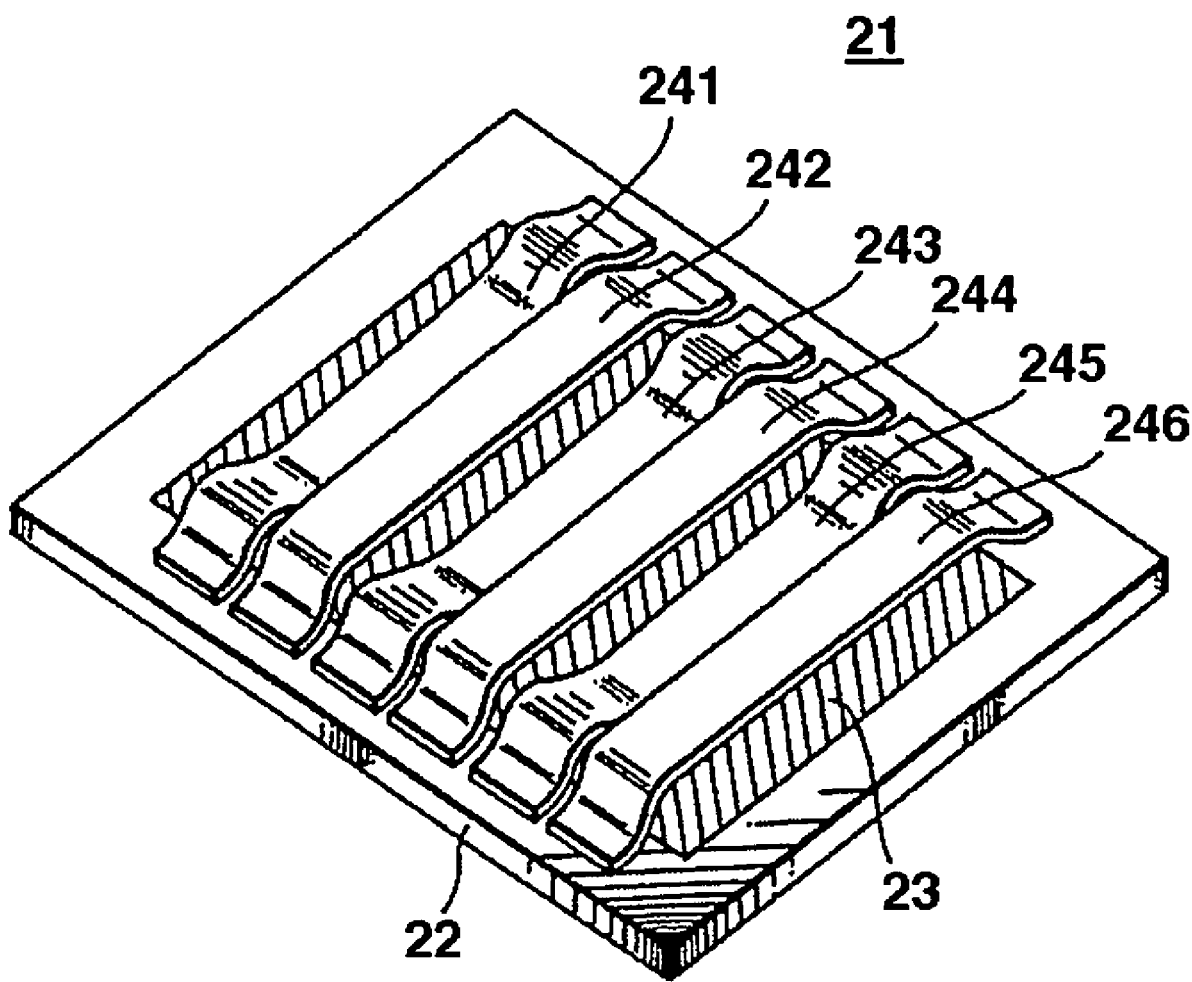
FIG. 1 is a view showing the construction of a GLV device that SLM Inc. has developed as a light intensity conversion device for a laser display, that is, an optical modulator.
Figure 2A:
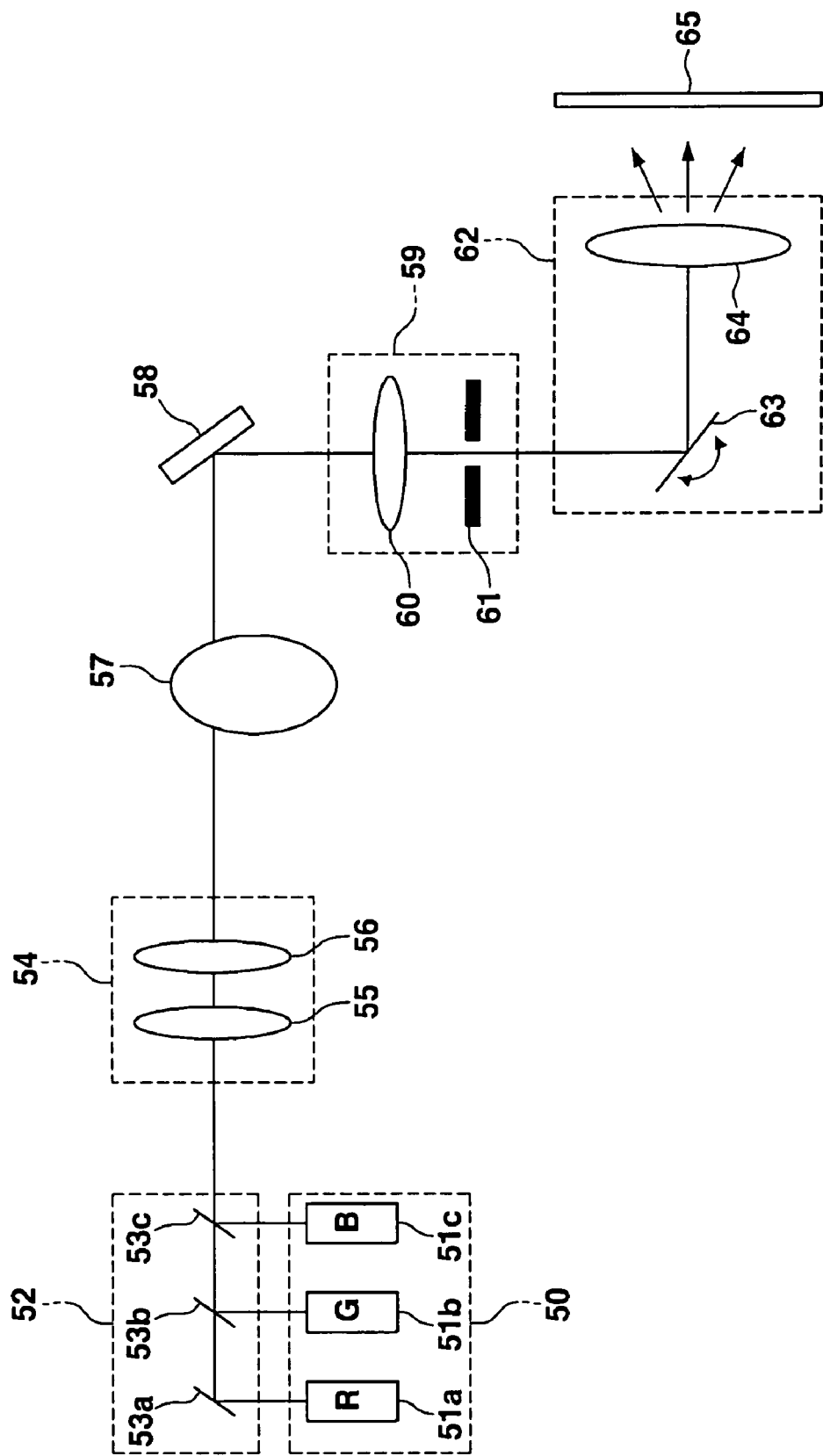
FIG. 2A is a diagram showing an example of a conventional one-panel optical apparatus using a GLV device as an optical modulation device to which a MEMS device is applied, or using a piezoelectric diffractive-type optical modulator.
Figure 2B:
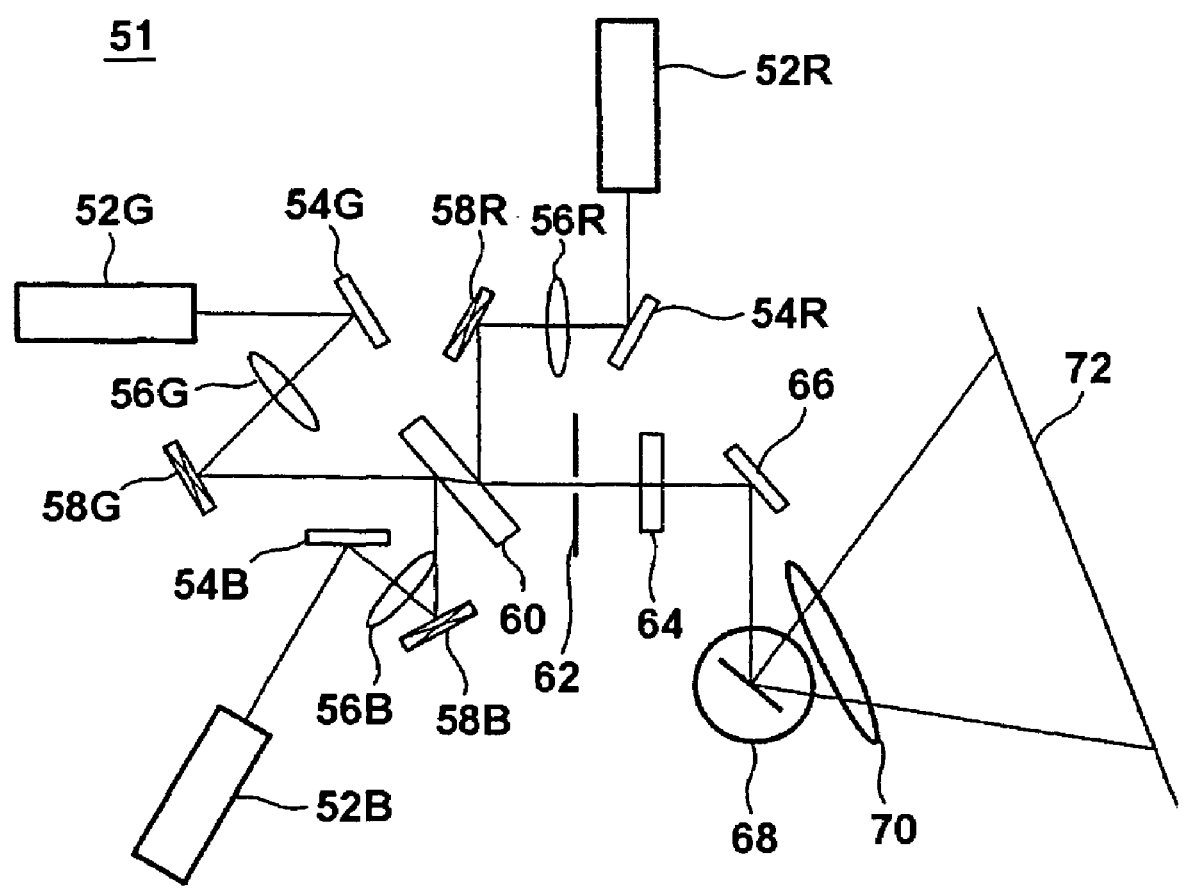
FIG. 2B is a diagram showing an example of a conventional three-panel optical apparatus using a GLV device as an optical modulation device to which a MEMS device is applied, or using a piezoelectric diffractive-type optical modulator.
Figure 3A:
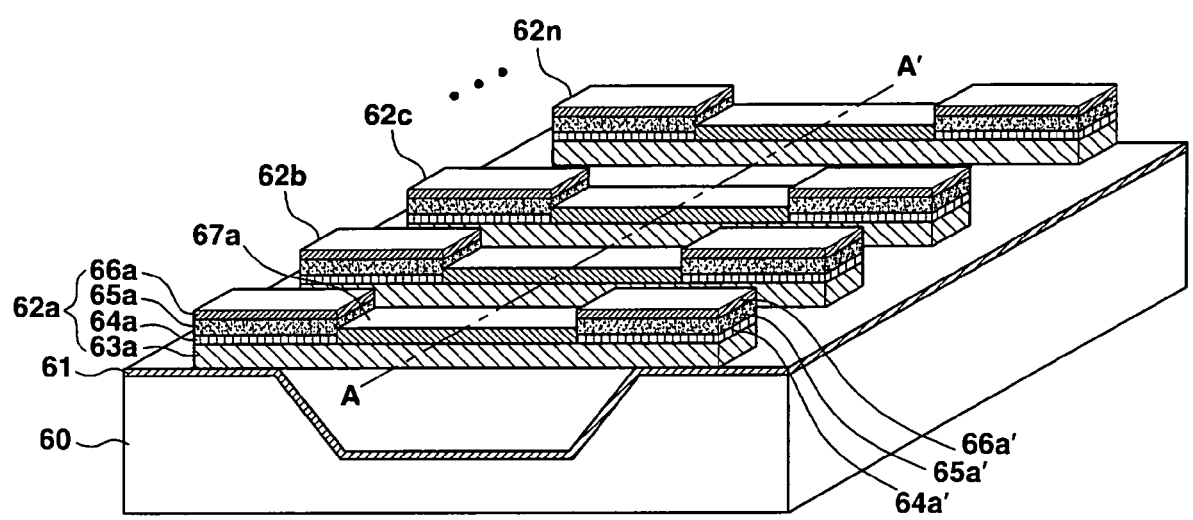
FIG. 3A is a perspective view of a recess and diffractive-type optical modulator that is applied to the present invention.
Figure 3B:
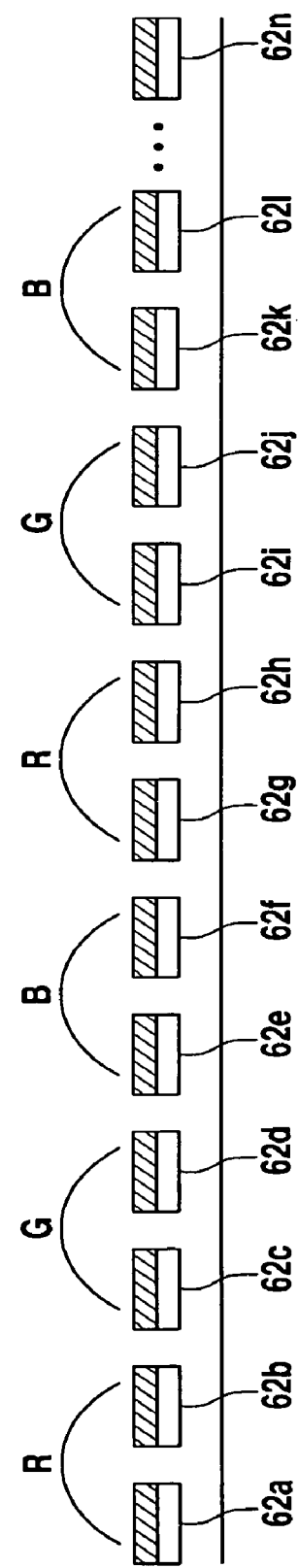
FIGS. 3B and 3C are sectional views taken along line A-A' of FIG. 3A, which show examples of the construction of a one-panel diffractive-type optical modulator according to the present invention.
Figure 3C:
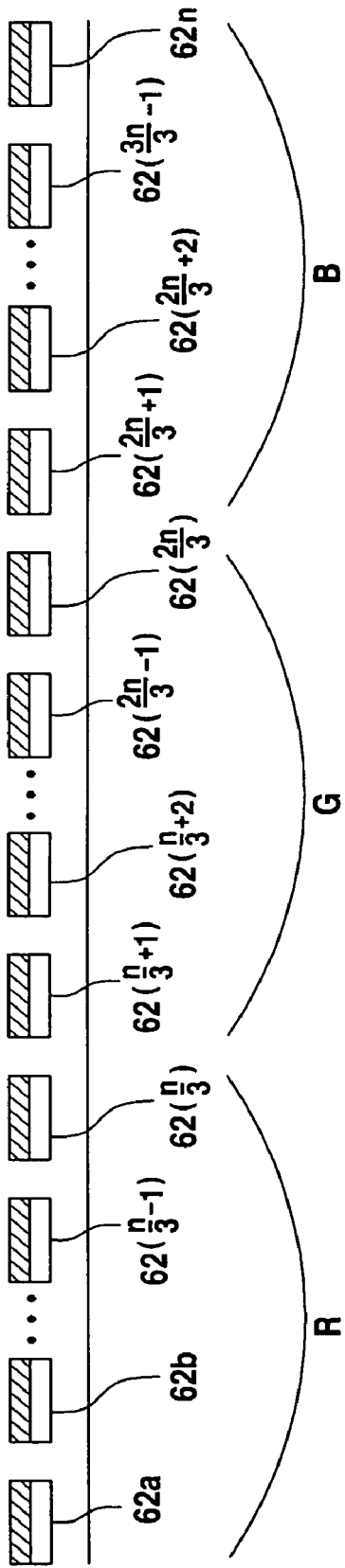

FIG. 3A is a perspective view of a recess and diffractive-type optical modulator that is applied to the present invention. FIGS. 3B and 3C are sectional views taken along line A-A' of FIG. 3A, which show examples of the construction of the one-panel diffractive-type optical modulator according to the present invention.

The one-panel diffractive-type optical modulator refers to a device for performing optical modulation on a plurality of wavelengths using a single diffractive-type optical modulator.

That is, in general three-panel diffractive-type optical modulator, in the case where a color display apparats is desired to be implemented using R, G and B colors, three diffractive-type optical modulator that can modulate respective colors of wavelengths are necessary. However, if the one-panel diffractive-type optical modulator is used, the color display apparatus can be implemented only using the one-panel diffractive-type optical modulator.

Referring to FIG. 3A, the one-panel diffractive-type optical modulator that is applied to the present invention includes a silicon substrate 60, and a plurality of elements 62a to 62n.

In this case, the plurality of elements 62a to 62n may constitute a one-panel diffractive-type optical modulator by being uniformly arranged with the same width. Furthermore, the plurality of elements 62a to 62n may constitute a one-panel diffractive-type optical modulator by being alternately arranged with different widths from each other.

The plurality of elements 62a to 62n can diffract incident light only when they include at least two elements (for example 62a and 62b). That is, when the wavelength of light entering into one element (for example, the element 62a) and another element (for example, the element 62b) neighboring the element 62a is defined as λ and a difference in height is a multiple of λ/4, incident light is diffracted and, therefore, diffractive light having a plurality of orders is formed. The formed diffracted light corresponds to a single pixel on a screen.

Accordingly, at least two elements (for example, the elements 62a and 62b) are necessary to constitute one pixel. In order to increase the intensity of diffractive light, four elements (for example, the elements 62a to 62d) may constitute one pixel, eight elements (for example, the elements 62a to 62h) may constitute one pixel, or twelve elements (for example the elements 62a to 62l).

Meanwhile, a case where two elements, which are a minimal unit of elements, constitute one pixel to implement the one-panel diffractive-type optical modulator of the present invention is described as an example with reference to FIGS. 3A and 3B. The one-panel diffractive-type optical modulator alternately performs optical modulation on a two-element basis in a one direction (in a rightward direction). For example, the optical modulation is performed in such a way that elements 62a and 62b perform optical modulation on an incident light beam having an R wavelength, elements 62c and 62d perform optical modulation on an incident light beam having an G wavelength, elements 62e and 62f perform optical modulation on an incident light beam having an B wavelength, and elements 62g and 62h perform optical modulation on an incident light beam having an R wavelength, and so on.

That is, the one-panel diffractive-type optical modulator of the present invention alternately performs optical modulation in the order of R, G and B on a two-element basis.

The one-panel diffractive-type optical modulator may be implemented such that elements corresponding to the number of all pixels necessary for displaying an image onto the screen perform optical modulation for a certain wavelength from one side, sequent elements corresponding to the number of all pixels necessary for displaying an image onto the screen perform optical modulation for another wavelength, and then sequent elements corresponding to the number of all pixels necessary for displaying an image onto the screen perform optical modulation for further wavelength.

A description related to this is given below with reference to FIG. 3C. Elements ranging from reference numeral 62a to reference numeral 62(n/3) perform optical modulation for a certain wavelength, elements ranging from reference numeral 62(n/3+1) to reference numeral 62(2n/3) perform optical modulation for a G wavelength, and elements ranging from reference numeral 62(2n/3+1) to reference numeral 62n perform optical modulation for an incident light beam having a B wavelength.

That is, a general diffractive-type optical modulator is classified according to a block. A certain block performs optical modulation for a certain wavelength, a sequent block performs optical modulation for another wavelength, and a sequent block performs optical modulation for further wavelength.

The descriptions of the silicon substrate 60 and the elements 62a to 62n constituting the one-panel diffractive-type optical modulator are made below.

The silicon substrate 60 is provided with a recess to provide an air space for elements 62a to 62n, an insulation layer 61 is disposed on the silicon substrate 60, and the end portions of the elements 62a to 62n are attached beside the recess.

Each of the elements (although only a description of an element indicated by reference numeral 62a is representatively made, descriptions of the others 62b to 62n are the same) has a ribbon shape, and is provided with a lower support 63a, the lower surfaces of both ends of which are attached beside the recess of the silicon substrate 60 such that the center portion of the element is spaced apart from the recess of the silicon substrate 60, and a portion 67a of which can move upward and downward, the portion being located above the recess of the silicon substrate 60.

Furthermore, the element 62a includes a lower electrode layer 64a disposed on the left end portion of the lower support 63a and configured to provide piezoelectric voltage, a piezoelectric material layer 65a disposed on the lower electrode layer 64a and configured to generate upward and downward drive forces due to contraction and expansion when voltage is applied to the two sides thereof, and a upper electrode layer 66a disposed on the piezoelectric material layer 65a and configured to provide piezoelectric voltage to the piezoelectric material layer 65a.

Furthermore, the element 62a includes a lower electrode layer 64a disposed on the left end portion of the lower support 63a and configured to provide piezoelectric voltage, a piezoelectric material layer 65a' disposed on the lower electrode layer 64a' and configured to generate upward and downward drive forces due to contraction and expansion when voltage is applied to the two sides thereof and a upper electrode layer 66a' disposed on the piezoelectric material layer 65a' and configured to provide piezoelectric voltage to the piezoelectric material layer 65a'.

Figure 4A:
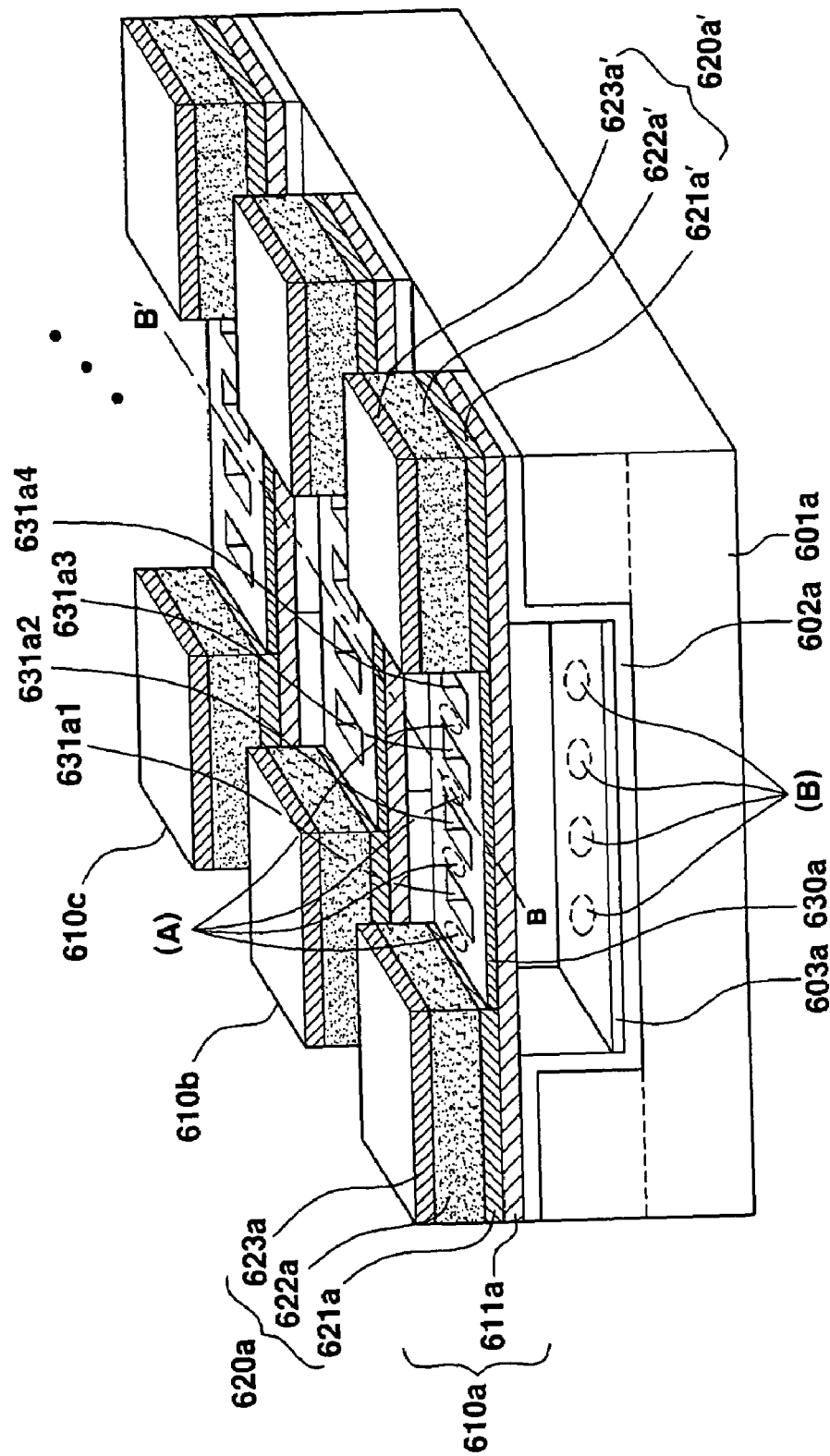
FIG. 4A is a perspective view of an open hole-based diffractive-type optical modulator that is applied to the present invention.
Figure 4B:
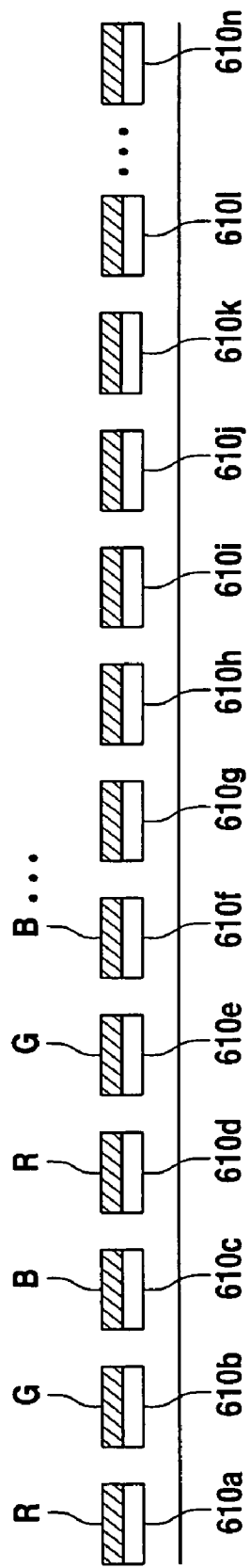
FIGS. 4B and 4C are sectional views taken along line B-B' of FIG. 4A, which show examples of the construction of the one-panel diffractive-type optical modulator according to the present invention.
Figure 4C:
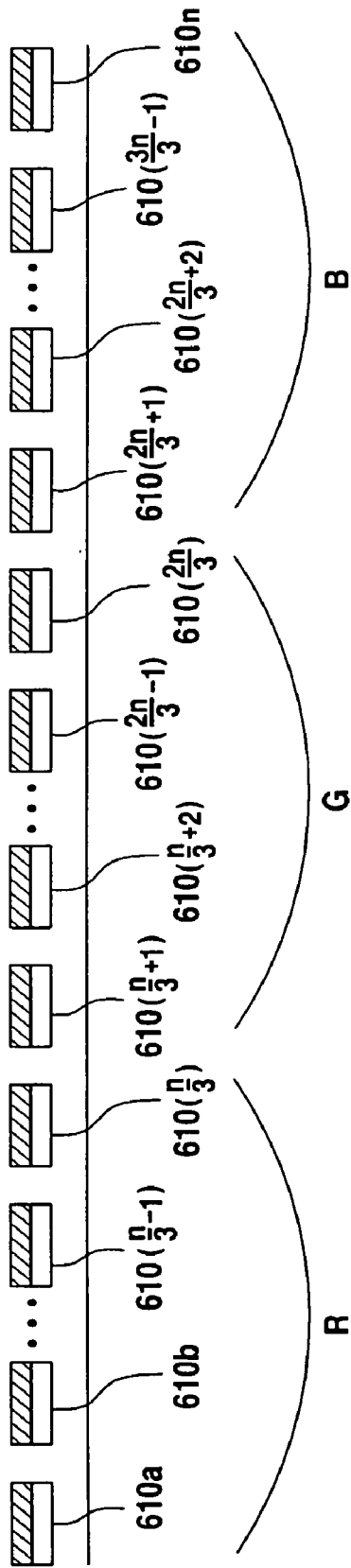

FIG. 4A is a perspective view of an open hole-based diffractive-type optical modulator that is applied to the present invention, and FIGS. 4B and 4C are sectional views taken along line B-B' of FIG. 4A, which show examples of the construction of the one-panel diffractive-type optical modulator according to the present invention.

Referring to FIG. 4A, the open hole-based diffractive-type optical modulator that is applied to the present invention includes a silicon substrate 601, an insulation layer 602, a lower micromirror 603, and a plurality of elements 610a to 610n. In this case, although the insulation layer and the lower micromirror are formed on different layers, the insulation layer itself may function as the micromirror when the insulation layer has a characteristic of reflecting light lower.

The silicon substrate 601 is provided with a recess to provide an air space for the elements 610a to 610n, an insulation layer 602 is disposed on the silicon substrate 501, a lower micromirror 603 is deposited on the insulation layer 502, and the lower surfaces of elements 610a to 610n are attached on the two sides of the recess. The silicon substrate 501 may be formed of a material, such as Si, Al2O3, ZrO2, Quartz or SiO2, and the bottom and top of the recess (in FIG. 4A, indicated by dotted lines) may be formed of heterogeneous materials different from each other.

The lower micromirror 603 is deposited on the upper portion of the silicon substrate 601, and causes incident light to be diffracted using reflection. The lower micromirror 603 may be formed of material such as metal (Al, Pt, Cr or Ag).

Each of the elements (although only a description of an element indicated by reference numeral 610a is representatively made, the others are the same) has a ribbon shape, and is provided with a lower support 611a, the lower surfaces of both ends of which are attached on two sides beside the recess of the silicon substrate 601 such that the center portion of the element is spaced apart from the recess of the silicon substrate 601.

Piezoelectric layers 620a and 620a' are provided on the two sides of the lower support 611a', and generate the drive force of the element 610a using the contraction and expansion of the piezoelectric layers 620a and 620a'.

A material for forming the lower support 511a may be Si oxide-based material (for example, $SiO_2$), Si nitride-based material (for example, $Si_3N_4$), a ceramic substrate (Si, $ZrO_2$, or $Al_2O_3$), Si carbide, or the like. The lower support 611a may be omitted according to need.

Furthermore, the left and right piezoelectric layers 620a and 620a' include lower electrode layers 621a and 621a' for providing piezoelectric voltage, piezoelectric material layers 622a and 622a' disposed on lower electrode layers 621a, 621a' and configured to generate upward and downward drive forces due to contraction and expansion when voltage is applied to the two sides thereof, and upper electrode layers 623a and 623a' disposed on the piezoelectric material layers 622a and 622a' and configured to provide piezoelectric voltage to the piezoelectric material layers 622a and 622a'. When voltage is applied to the upper electrode layers 623a and 623a' and the lower electrode layers 621a and 621a', the piezoelectric material layers 622a and 622a' are contracted or expanded, thus causing the lower support 611a to move upward or downward.

The electrodes 621a, 621a', 623a and 623a' may be formed of an electrode material, such as Pt, Ta, Ni, Au, Al, or $RuO_2$, and the electrode materials are deposited within a range of 0.01 to 3 μm using a sputter method, an evaporation method, or the like.

Meanwhile, an upper micromirror 630a is deposited on the center portion of the lower support 611a, and a plurality of open holes 631a1 to 631a4 are formed thereon. In this case, although it is preferred that each of the open holes 531a1 to 531a4 be formed in a rectangular shape, they may be formed in any closed-curve shape, such as a circular shape or an oval shape. Furthermore, in the case where the lower support is formed of a light-reflective material, it is not necessary to separately deposit the upper micromirror, and it is possible to allow the lower support to function as the upper micromirror.

The open holes 631a1 to 631a4 allow light incident on the element 610a to pass through the element 610a and to be incident on the portions of the lower micromirror layer 603 corresponding to the open holes 631a1 to 631a4, thus allowing the lower micromirror layer 603 and the upper micromirror layer 603a to form pixels.

That is, for example, portion (A) of the upper micromirror layer 630a, through which the open holes 631a1 to 631a4 are formed, and portion (B) of the lower micromirror layer 603 may form a single pixel.

In this case, incident light, which has passed through the portion of the upper micromirror layer 603a through which the open holes 631a1 to 631a4 are formed, can be incident on the corresponding portion of the lower micromirror layer 603. When the interval between the upper micromirror layer 630a and the lower micromirror layer 630 is an odd multiple of $\lambda/4$, maximally diffracted light is generated.

Meanwhile, an example of implementing the one-panel diffractive-type optical modulator of the present invention is described with reference to FIGS. 4A and 4B. The one-panel diffractive-type optical modulator alternately performs optical modulation on two-element basis in one side direction (in a right direction). For example, reference numeral 610a performs optical modulation on an incident light beam having an R wavelength, reference numeral 610*b* performs optical modulation on an incident light beam having an G wavelength, reference numeral 610*c* performs optical modulation on an incident light beam having an B wavelength, and reference numeral 610*d* performs optical modulation on an incident light beam having an R wavelength.

That is, the one-panel diffractive-type optical modulator of the present invention alternately performs optical modulation in R, G and B order on two-element basis.

The one-panel diffractive-type optical modulator may be implemented such that elements corresponding to the number of all pixels necessary for displaying an image onto the screen perform optical modulation for a certain wavelength from one side, sequent elements corresponding to the number of all pixels necessary for displaying an image onto the screen perform optical modulation for another wavelength, and then sequent elements corresponding to the number of all pixels necessary for displaying an image onto the screen perform optical modulation for further wavelength.

A descriptions related to this is given below with reference to FIGS. 4A and 4C. Elements ranging from reference numeral 610*a* to reference numeral 610(*n*/3) perform optical modulation for a certain wavelength, elements ranging from reference numeral 610(*n*/3+1) to reference numeral 610(2*n*/3) perform optical modulation for a G wavelength, and elements ranging from reference numeral 610(2*n*/3+1) to reference numeral 610*n* perform optical modulation for an incident light beam having a B wavelength.

That is, a general diffractive-type optical modulator is classified according to a block. A certain block performs optical modulation for a certain wavelength, a sequent block performs optical modulation for another wavelength, and a sequent block performs optical modulation for further wavelength.

Figure 5:
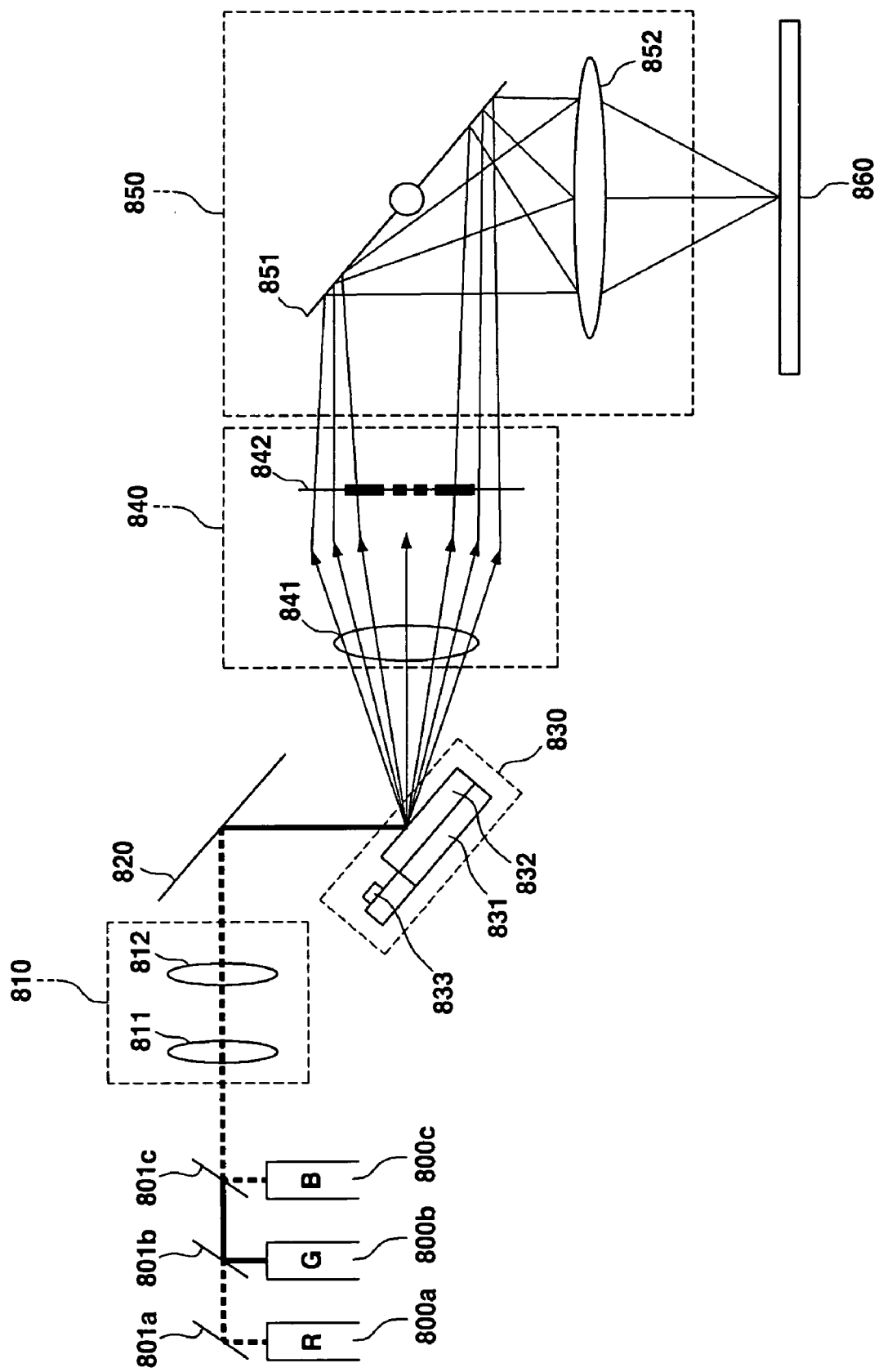
FIG. 5 is a diagram showing the construction of a color display apparatus using the one-panel diffractive-type optical modulator of FIGS. 4A and 4B.

FIG. 5 is a diagram showing the construction of a color display apparatus using the one-panel diffractive-type optical modulator of FIGS. 4A and 4B.

Referring to FIG. 5, the color display apparatus using the one-panel diffractive-type optical modulator of FIGS. 4A and 4B includes a plurality of light sources 800*a* to 800*c*, a plurality of front-end dichroic mirrors 801*a* to 801*c*, an illumination lens system 810, a reflective mirror 820, an optical modulation system 830, a Fourier filter system 840, a projection system 850, and a screen 860.

The plurality of light sources 800*a* to 800*c* generate and emit light beams having wavelengths different from each other, and the plurality front-end dichroic mirrors 801*a* to 801*c* gather and emit the light beams having wavelengths different from each other. The section of each of the light sources 800*a* to 800*c* is a circular shape, and the profile of each of the light beams has Gaussian distribution.

The illumination lens system 810 converts incident light into linear parallel light and emits the converted light, and is composed of a cylinder lens 811 and a collimation lens 821.

In this case, the cylinder lens 811 converts the incident light, which is emitted from the front-end dichroic mirrors 801*a* to 801*c*, into a lateral direction of linear light Thereafter, the linear light is converted into parallel light through the collimation lens 821 and enters into a one-panel diffractive-type optical modulator 832.

The collimation lens 821, for example, includes a concave lens and a convex lens.

The reflective mirror 820 reflects incident light so that the incident light almost vertically enters to the one-panel diffractive-type optical modulator 832.

The optical modulation system 830 includes a substrate 831, a one-panel diffractive-type optical modulator 832 formed in a substrate 831, a drive Integrated Circuit (IC) 833, and converts incident light into diffractive light and emits the resulting diffractive light.

In this case, the one-panel diffractive-type optical modulator 832 performs optical modulation on the incident light having a plurality of wavelengths on a wavelength basis, and generates and emits the diffractive light having a plurality of diffractive orders for each light beam.

Thereafter, the diffractive light formed by the one-panel diffractive-type optical modulator 832 is formed of 0-order of diffractive light, ±1-order of diffractive light, and 1-order of diffractive light in a periodical direction. In this case, the diffractive light of incident light, having a long wavelength, is further diffracted and, as a result, −1-order of R diffractive light, −1-order of G diffractive light, −1-order of B diffractive light, 0-order of RGB diffractive light, +1-order of B diffractive light, +1-order of G diffractive light, and +1-order of R diffractive light are formed from one side.

In this case, when the diffraction grating period of elements is appropriately adjusted, a diffracted angle varies according to wavelength, so that, from left side, +1-order of R diffractive light, +1-order of G diffractive light, +1-order of B diffractive light, 0-order of RGB diffractive light, 1-order of B diffractive light, −1-order of G diffractive light, and −1-order of R diffractive light are not formed, but a single of −1-order of RGB diffractive light, 0-order of RGB diffractive light, and +1-order of RGB diffractive light are formed.

Meanwhile, the Fourier filter system 840 is composed of a Fourier lens 841 and a dichroic filter 842, and selectively passes 0-order of diffractive light or ±1-order of incident diffractive light therethrough.

The projection system 850 is composed of a scanner 851 and a projection lens 852, and projects incident diffractive light onto the screen 860. That is, the projection system 850 performs a role of forming a pixel by focusing diffractive beams, each of which has a diffractive and which enters through the dichroic filter 842, onto the screen 860.

Meanwhile, in the one-panel diffractive-type optical modulator 832, the drive IC 831 alternately performs sequential control so as to form diffractive light for R, G and B incident light from the left side or from the right side in response to a control signal received from the outside. That is, the drive IC 831 alternately performs optical modulation on incident light in order of R, G, B, R, G, B, R, G and B beams.

Besides, the drive IC 831 classifies the one-panel diffractive-type optical modulator 832 according to block. A first block may be implemented so as to perform optical modulation on R light, a second block may be implemented so as to perform optical modulation on G light, and a third block may be implemented so as to perform optical modulation on B light. In this case, the construction of the optical system may differ slightly from that of the optical system described in FIG. 5.

Figure 6:
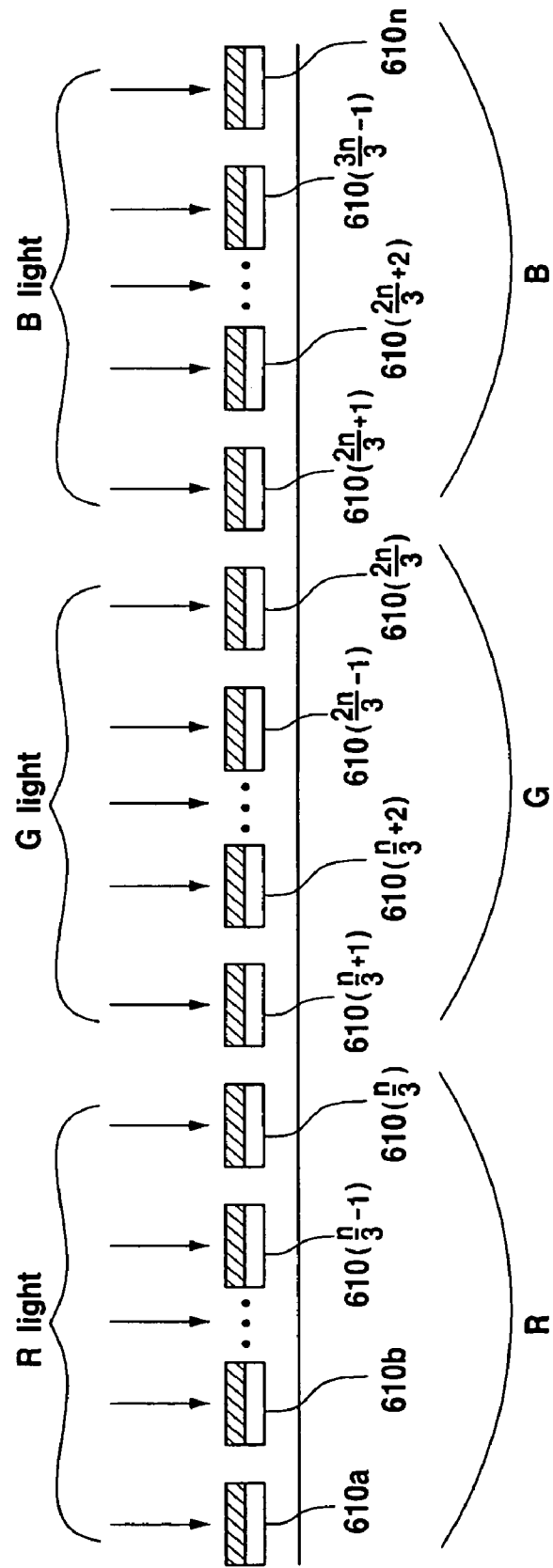
FIG. 6 is a conceptual diagram illustrating the incident light of a color display apparatus using the one-panel diffractive-type optical modulator of FIGS. 4A and 4C.

FIG. 6 is a conceptual diagram illustrating the incident light of a color display apparatus using the one-panel diffractive-type optical modulator of FIGS. 4A and 4C, where a one-panel diffractive-type optical modulator in which blocks are classified according wavelength is used.

That is, the one-panel diffractive-type optical modulator may be implemented such that elements corresponding to the number of all pixels necessary for displaying an image onto the screen perform optical modulation for a certain wavelength from one side, sequent elements corresponding to the number of all pixels necessary for displaying an image onto the screen perform optical modulation for another wavelength, and then sequent elements corresponding to the number of all pixels necessary for displaying an image onto the screen perform optical modulation for further wavelength.

Accordingly, the incident light of the color display apparatus using the one-panel diffractive-type optical modulator, as shown in FIG. 6, may be implemented such that corresponding incident light (R linear parallel light, G linear parallel light, and B linear parallel light) enters into corresponding blocks (R block, G block, and B block).

A description related to this is given below with reference to FIGS. 4A and 4C. Elements ranging from reference numeral 610$a$ to reference numeral 610($n$/3) perform optical modulation for a certain wavelength and R linear parallel light enters in this block interval, elements ranging from reference numeral 610($n$/3+1) to reference numeral 610($2n$/3) perform optical modulation for a G wavelength and G linear parallel light enters in this block interval, and elements ranging from reference numeral 610($2n$/3+1) to reference numeral 610$n$ perform optical modulation for an incident light beam having a B wavelength and B linear parallel light enters in this block interval.

As described above, in the case where the one-panel diffractive-type optical modulator in which blocks are classified according wavelength is used, it is not necessary to condense respective wavelengths of diffractive light. For this purpose, a light-condensing optical system is further necessary. Such a light-condensing optical system may be easily implemented by those skilled in the art.

Meanwhile, although descriptions of the color display apparatus are made herein, it can be easily understood that the present invention can be applied to different application printers that use a plurality of optical modulators corresponding to a plurality of wavelengths.

As described above, in accordance with the present invention, optical efficiency can be increased, and the construction of an optical system can be simplified.

Furthermore, a single modulator is used instead of a plurality of optical modulators, so that the cost of a product can be lowered, therefore the competitiveness of price of the product can be enhanced.

Furthermore, stacking of the drive IC can be facilitated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A color display apparatus using a one-panel diffractive optical modulator, comprising:
    a plurality of light sources for simultaneously emitting light beams of corresponding wavelengths;
    an illumination lens system for allowing respective light beams, which are emitted from the plurality of light sources, to be converted into linear parallel light and simultaneously enter;
    a diffractive optical modulator comprising a substrate, a plurality of reflecting parts arranged to form an array, configured such that center portions of the plurality of reflection parts are spaced apart from the substrate and surfaces of the plurality of reflection parts oppose the substrate reflect incident light, and configured to be supported by the substrate, and actuating means for moving the center portions of the plurality of reflection parts so as to become away from or approach the substrate, the diffractive optical modulator forming diffractive light by diffracting incident light when locations of at least two neighboring reflection parts vary to a predetermined distance by the actuating means, and the reflecting parts simultaneously emitting diffractive light having a plurality of wavelengths by allowing the plurality of reflective units to generate and emit diffractive light for incident light of respective assigned wavelengths when wavelengths of the incident light to have to be modulated by the plurality of reflective units are assigned and linear parallel light having different wavelengths different enters simultaneously;
    a filter system for allowing diffractive light having a desired diffractive order for respective wavelengths to pass therethrough when diffractive light having a plurality of diffractive orders for the respective wavelengths enters from the diffractive optical modulator; and
    a projection system for generating an image on a target object by scanning diffractive light filtered by the filter system on the target object.

2. The color display apparatus as set forth in claim 1, further comprising a drive Integrated Chip (IC) for controlling the actuating means of the diffractive optical modulator, thus allowing the diffractive optical modulator to emit diffractive light having a plurality of wavelengths by allowing the plurality of reflective units to generate and emit diffractive light for incident light of the respective assigned wavelengths.

3. The color display apparatus as set forth in claim 1, wherein the diffractive optical modulator is configured in such a manner that the neighboring reflection parts are grouped in groups of an integer multiple of a number of the wavelengths and, thus, forms a plurality of groups, and each of the plurality of groups assigns wavelengths to have to be modulated to the reflection parts of a corresponding group, and allows the reflection parts of the corresponding group to generate and output diffractive light for incident light having assigned wavelengths when incident light having different wavelengths simultaneously enters into the plurality of groups, thus simultaneously emitting diffractive light having a plurality of wavelengths.

4. The color display apparatus as set forth in claim 1, wherein the diffractive optical modulator is configured in such a manner that the reflection parts neighboring each other are grouped and, thus, forms a plurality of groups, wavelengths to have to be modulated is assigned to the reflection parts, and each of the plurality of groups generates and emits diffractive light for incident light having assigned wavelengths in the corresponding group when incident light having different wavelengths simultaneously enters into the plurality of groups, thus simultaneously emitting diffractive light having a plurality of wavelengths.

5. A color display apparatus using a one-panel diffractive optical modulator, comprising:
    a plurality of light sources for simultaneously emitting light beams of corresponding wavelengths;
    an illumination lens system for converting the light beams, which are emitted from the plurality of light sources, into linear parallel light and causing the converted light to enter;
    a diffractive optical modulator comprising a substrate, a plurality of first reflection parts arranged to form an array, configured such that center portions of the plurality of first reflection parts are spaced apart from the substrate and have one or more open holes so that surfaces of the plurality of first reflection parts oppose the substrate reflect incident light and the incident light is passed therethrough, and configured to be supported by the substrate, a second reflection part configured to be located between the first reflection parts and the substrate, to be spaced apart from the first reflection parts, and to reflect incident light that passes through one or more open holes of the first reflection parts, and actuating means for moving the center portions of the plurality of reflection parts so as to vary distances to the second reflection parts and varying an amount of diffractive light formed by reflective light of the first and second reflection parts, the diffractive optical modulator forming diffractive light by diffracting incident light when locations of at least two neighboring first reflection parts vary to a predetermined distance with respect to those of the second reflection parts by the actuating means, and emitting diffractive light having a plurality of wavelengths by allowing the plurality of first reflective unit to generate and emit diffractive light for incident light of assigned wavelengths when wavelengths of the incident light to have to be modulated by the plurality of first reflective units are assigned and linear parallel light having different wavelengths enters simultaneously;

a filter system for passing diffractive light having a desired diffractive order for respective wavelengths therethrough when diffractive light having a plurality of diffractive orders for the respective wavelengths enters from the diffractive optical modulator; and a projection system for generating an image on a target object by scanning diffractive light filtered by the filter system on the target object.

6. The color display apparatus as set forth in claim 5, further comprising a drive Integrated Chip (IC) for controlling the actuating means of the diffractive optical modulator, thus allowing the diffractive optical modulator to emit diffractive light having a plurality of wavelengths by allowing the plurality of reflective units to generate and emit diffractive light for incident light of the respective assigned wavelengths.

7. The color display apparatus as set forth in claim 5, the diffractive optical modulator is configured in such a manner that the first neighboring reflection parts are grouped in groups of an integer multiple of a number the wavelengths and, thus, forms a plurality of groups, and each of the plurality of groups assigns wavelengths to have to be modulated to the first reflection parts of a corresponding group, allows the first reflection parts of the corresponding group to generate and output diffractive light for incident light having assigned wavelengths when incident light having different wavelengths simultaneously enters into the plurality of groups, thus simultaneously emitting diffractive light having a plurality of wavelengths.

8. The color display apparatus as set forth in claim 5, wherein the diffractive optical modulator is configured in such a manner that the first neighboring reflection parts are grouped and, thus, forms a plurality of groups, wavelengths to have to be modulated is assigned to the reflection parts, and each of the plurality of groups generates and emits diffractive light for incident light having an assigned wavelength in the corresponding group when incident light having different wavelengths simultaneously enters into the plurality of groups, thus simultaneously emitting diffractive light having a plurality of wavelengths.

* * * * *